United States Patent
Kim

(10) Patent No.: US 11,767,009 B2
(45) Date of Patent: Sep. 26, 2023

(54) ELECTRIC POWER STEERING APPARATUS AND METHOD CAPABLE OF ADJUSTING ASSIST TORQUE BASED ON POSSIBILITY OF HEAD-ON COLLISION AND SIDE COLLISION

(71) Applicant: HL MANDO CORPORATION, Pyeongtaek-si (KR)

(72) Inventor: EeiYun Kim, Seongnam-si (KR)

(73) Assignee: HL Mando Corporation, Pyeongtaek-si (KR)

(*) Notice: Subject to any disclaimer, the term of this patent is extended or adjusted under 35 U.S.C. 154(b) by 294 days.

(21) Appl. No.: 16/201,406

(22) Filed: Nov. 27, 2018

(65) Prior Publication Data

US 2019/0161079 A1     May 30, 2019

(30) Foreign Application Priority Data

Nov. 30, 2017    (KR) ........................ 10-2017-0162745

(51) Int. Cl.

| B60W 30/09 | (2012.01) |
|---|---|
| B62D 15/02 | (2006.01) |
| G06V 20/58 | (2022.01) |
| B60W 30/095 | (2012.01) |

(52) U.S. Cl.
CPC ......... *B60W 30/09* (2013.01); *B62D 15/0265* (2013.01); *G06V 20/58* (2022.01); *B60W 30/0956* (2013.01); *B60W 2554/00* (2020.02); *B62D 15/021* (2013.01)

(58) Field of Classification Search
CPC ............. B60W 30/09; B60W 2554/00; B60W 30/0956; B60W 2540/18; G06K 9/00805; B62D 15/0265; B62D 15/021
See application file for complete search history.

(56) References Cited

U.S. PATENT DOCUMENTS 6,256,584 B1 * 7/2001 Kodaka .............. B62D 15/0265
                                                                      340/904
9,105,190 B2 * 8/2015 Akiyama .............. B60W 10/20
(Continued)

FOREIGN PATENT DOCUMENTS

DE      102010045694     *   3/2012
DE      102010045694 A1    3/2012
(Continued)

OTHER PUBLICATIONS

RD420052; Apr. 1999; Research Disclosure database (Year: 1999).*
(Continued)

*Primary Examiner* — David P. Merlino
(74) *Attorney, Agent, or Firm* — Morgan, Lewis & Bockius LLP

(57) ABSTRACT

An electric power steering apparatus includes a processor configure to determine whether an assistance adjustment condition is satisfied on the basis of whether there is a possibility of a vehicle colliding with an object in front or to a side, determine a critical collision steering angle at which the vehicle collides with the object to the side when it is determined by the assistance adjustment condition determination unit that the assistance adjustment condition is satisfied, and adjust an assistance on the basis of the critical collision steering angle.

20 Claims, 7 Drawing Sheets

(56) References Cited

U.S. PATENT DOCUMENTS

| | | | | |
|---|---|---|---|---|
| 2003/0060936 | A1* | 3/2003 | Yamamura | B62D 15/0265 348/148 |
| 2003/0197601 | A1* | 10/2003 | Takagi | G08G 1/16 340/407.1 |
| 2006/0022619 | A1* | 2/2006 | Koike | B62D 5/0469 318/52 |
| 2008/0144985 | A1* | 6/2008 | Joki | B60B 3/04 301/109 |
| 2013/0166150 | A1* | 6/2013 | Han | B60W 10/18 701/41 |
| 2013/0218396 | A1* | 8/2013 | Moshchuk | B60W 50/08 701/25 |
| 2013/0226408 | A1* | 8/2013 | Fung | G06V 20/597 701/1 |
| 2015/0066241 | A1* | 3/2015 | Akiyama | B60W 30/09 701/1 |
| 2015/0210310 | A1* | 7/2015 | Akatsuka | B62D 5/0472 701/41 |
| 2015/0353133 | A1* | 12/2015 | Mukai | B62D 15/0265 701/41 |
| 2016/0009318 | A1* | 1/2016 | Morotomi | B62D 15/0265 701/41 |
| 2016/0144896 | A1* | 5/2016 | Takahashi | B62D 6/00 701/41 |
| 2018/0037216 | A1* | 2/2018 | Otake | B60W 30/18109 |
| 2018/0118200 | A1* | 5/2018 | Yamaguchi | B60W 30/0956 |
| 2018/0339727 | A1* | 11/2018 | Ueyama | B62D 5/065 |
| 2019/0100197 | A1* | 4/2019 | Saiki | B60W 50/14 |
| 2019/0299982 | A1* | 10/2019 | Guechai | B60W 30/09 |

FOREIGN PATENT DOCUMENTS

| | | |
|---|---|---|
| DE | 102012010130 A1 | 12/2012 |
| DE | 102013223377 A1 | 6/2015 |
| DE | 102016109856 A1 | 11/2017 |
| JP | 2005-14710 A | 1/2005 |
| JP | 2014-205457 A | 10/2014 |
| JP | 2017-7412 A | 1/2017 |
| KR | 10-0132197 B1 | 4/1998 |
| KR | 10-2007-0105386 A | 10/2007 |

OTHER PUBLICATIONS

Office Action issued in corresponding Korean Application No. 10-2017-0162745, dated Mar. 12, 2019.

Office Action issued in Germany Patent Application No. 102018129524.3 dated Feb. 19, 2021.

* cited by examiner

ELECTRIC POWER STEERING APPARATUS AND METHOD CAPABLE OF ADJUSTING ASSIST TORQUE BASED ON POSSIBILITY OF HEAD-ON COLLISION AND SIDE COLLISION

CROSS REFERENCE TO RELATED APPLICATION

This application claims the benefit of priority to Korean Patent Application No. 10-2017-0162745, filed on Nov. 30, 2017, which is hereby incorporated by reference for all purposes as if fully set forth herein.

TECHNICAL FIELD

The present disclosure relates to an electric power steering (EPS) apparatus and method, and particularly relates to an electric power steering apparatus and method capable of reducing the degree of assistance of an EPS apparatus to relatively weight steering and thus to delay the time it takes for a crash to occur when the vehicle is likely to collide with an object beside the vehicle due to a change of the steering angle of the vehicle and the steering angle of the vehicle is actually changed such that a collision may occur.

BACKGROUND

Recently, vehicles have an increasing number of electronic functions, and thus various electronic apparatuses are installed and used in the vehicles.

The electronic apparatuses installed in the vehicles may include, for example, an electronic apparatus for controlling an engine, an electronic apparatus for controlling a power transfer apparatus, an electronic apparatus for controlling a brake apparatus, an electronic apparatus for controlling a suspension apparatus, an electronic apparatus for controlling a steering apparatus, an electronic apparatus for controlling an instrument apparatus, an electronic apparatus for controlling information communication, and an electronic apparatus for a power/wire hardness.

In order to control the electronic apparatuses, generally, a vehicle electronic control unit (ECU) is provided in a vehicle to receive electrical signals detected by various input sensors and output digital control signals for driving various actuators at an output side.

An electric power steering (EPS) apparatus for increasing and decreasing an operational force of a steering wheel according to a vehicle speed by means of the ECU adjusts an assistance torque amount (hereinafter referred to as assistance) for assisting a driver in operating the steering wheel by driving a motor. The ECU calculates an optimal force and gives instructions to the motor on the basis of information such as a speed and information regarding a rotational angle sensor, which is installed at a steering wheel or a steering shaft and is called a steering angle sensor.

However, the EPS apparatus assisting the steering operation may cause a problem. For example, it is assumed that an obstacle or another vehicle is present beside the vehicle. When the driver changes the steering such that the vehicle is likely to collide with the object beside the vehicle, the assistance of the steering rather increases the possibility of collision with the object to the side.

For example, when the driver falls unconscious during driving such that the steering of the vehicle may be suddenly changed, the ECU assisting in changing the steering may cause the vehicle to rotate rapidly irrespective of the driver's intention. Also, when a driver intentionally makes a collision with an obstacle on the side, the ECU assisting in changing the steering may rather assist the driver in colliding.

SUMMARY

The present disclosure provides an electric power steering apparatus and method capable of determining whether an assistance adjustment condition is satisfied on the basis of whether there is a possibility of a vehicle colliding with an object in front or to a side, determining a critical collision steering angle at which the vehicle collides with the object to the side when the assistance adjustment condition is satisfied, and adjusting an assistance on the basis of the critical collision steering angle.

According to an aspect of the present disclosure, a steering control system of a vehicle may include an image sensor disposed in the vehicle to have visibility to an outside of the vehicle and configured to capture image data, a non-image sensor disposed in the vehicle to have a monitoring region for the outside of the vehicle and configured to capture sensing data, at least one processor configured to process the image data captured by the image sensor and the sensing data captured by the non-image sensor, and a controller configured to adjust an assistance value according to a steering angle of the vehicle, at least partially on the basis of the processing of the image data and the sensing data. The controller is operable i) to determine whether there is a possibility of the vehicle colliding with an object in front or to a side, ii) to determine whether an assistance adjustment condition is satisfied on the basis of whether there is a possibility of the vehicle colliding with the object in front or to a side, iii) to determine a critical collision steering angle at which the vehicle collides with the object to the side when it is determined that the assistance adjustment condition is satisfied, and iv) to adjust the assistance value according to the steering angle of the vehicle on the basis of the critical collision steering angle.

According to another aspect of the present disclosure, a steering control system of a vehicle may include an image sensor disposed in the vehicle to have visibility to an outside of the vehicle and configured to capture image data, a non-image sensor disposed in the vehicle to have a monitoring region for the outside of the vehicle and configured to capture sensing data, and a domain control unit configured to process the image data captured by the image sensor and the sensing data captured by the non-image sensor and control at least one driver assistance system provided in the vehicle, wherein the domain control unit is operable i) to determine whether there is a possibility of the vehicle colliding with an object in front or to a side, ii) to determine whether an assistance adjustment condition is satisfied on the basis of whether there is a possibility of the vehicle colliding with the object in front or to a side, iii) to determine a critical collision steering angle at which the vehicle collides with the object to the side when it is determined that the assistance adjustment condition is satisfied, and iv) to adjust the assistance value according to a steering angle of the vehicle on the basis of the critical collision steering angle.

According to still another aspect of the present disclosure, a non-image sensor disposed in a vehicle to have a monitoring region for an outside of the vehicle may be configured to capture sensing data, wherein the sensing data is processed by a processor and is used to determine whether there is a possibility of the vehicle colliding with an object in front or to a side, and wherein the collision possibility is used to determine whether an assistance adjustment condition is satisfied, a critical collision steering angle at which the vehicle collides with the object to the side is derived when it is determined that the assistance adjustment condition is satisfied, and an assistance value according to a steering angle of the vehicle is adjusted on the basis of the critical collision steering angle.

According to still another aspect of the present disclosure, an electric power steering apparatus of a vehicle may include a processor configured to determine whether an assistance adjustment condition is satisfied on the basis of whether there is a possibility of the vehicle colliding with an object in front or to a side, determine a critical collision steering angle at which the vehicle collides with the object to the side when it is determined by the assistance adjustment condition determination unit that the assistance adjustment condition is satisfied, and adjust an assistance on the basis of the critical collision steering angle.

According to still another aspect of the present disclosure, a method of adjusting an assistance on the basis of whether there is a possibility of a vehicle colliding with an object in front or to a side by means of an electric power steering apparatus of the vehicle may include steps of determining whether an assistance adjustment condition is satisfied on the basis of whether there is a possibility of the vehicle colliding with the object in front or to a side, determining a critical collision steering angle at which the vehicle collides with the object to the side when it is determined in the assistance adjustment condition determination operation that the assistance adjustment condition is satisfied, and adjusting an assistance value according to a steering angle of the vehicle on the basis of the critical collision steering angle by means of the electric power steering apparatus of the vehicle.

Other specific details of the present disclosure are included in the detailed description and drawings.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
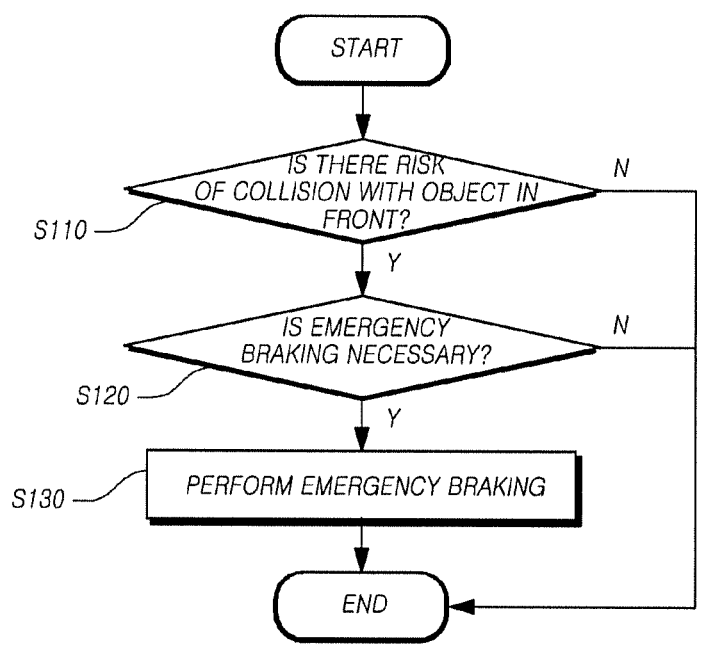
FIG. 1 is a flowchart showing a process in which a collision prevention operation is performed in a conventional vehicle.

Hereinafter, some embodiments of the present disclosure will be described in detail with reference to the accompanying drawings. In adding reference numerals to elements in each figure, it should be noted that the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In addition, terms such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one element is "connected," "combined" or "coupled" to another element, a third element may be "connected," "combined," and "coupled" between the first and second elements, although the first element may be directly connected, coupled or joined to the second element.

FIG. 1 is a flowchart showing a process in which a collision prevention operation is performed in a conventional vehicle.

First, a conventional vehicle determines whether there is a risk of collision with an object in front (S110).

When the vehicle determines that there is a risk of collision with the object in front (Y in S110), the vehicle determines whether emergency braking is necessary (S120). When the vehicle determines that the collision with the object in front may be avoided or that an impulse upon the collision may be reduced, the vehicle may perform an emergency braking operation.

When the vehicle determines that the emergency braking is necessary (Y in S120), the vehicle may perform emergency braking using an automatic emergency braking (AEB) system (S130).

As described above, the conventional vehicle performs a function of adjusting the vehicle braking when there is a risk of a front collision or does not perform a function of avoiding a collision with an object beside the vehicle through lateral direction control. A system used for the lateral direction control of the conventional vehicle, such as a vehicle stability management (VSM) system and a lane keeping assist (LKAS) system, is merely used as a concept for assisting a driver in driving a vehicle when the vehicle is traveling but does not perform a function associated with prevention of collision with an object to a side.

Figure 2A:
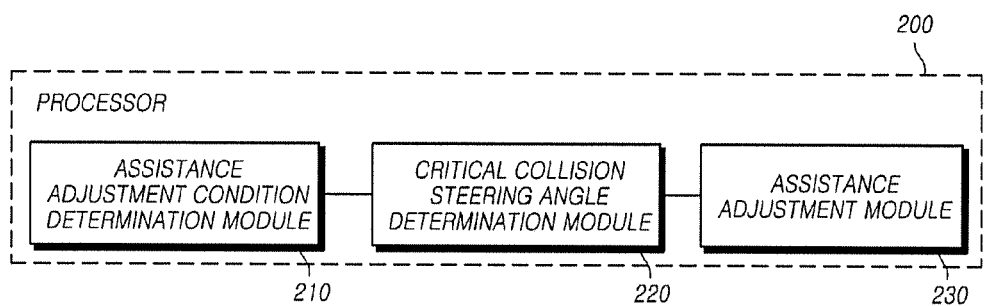
FIG. 2A is a block diagram showing components of an electric power steering apparatus according to an embodiment of the present disclosure.

FIG. 2A is a block diagram showing components of an electric power steering apparatus according to an embodiment of the present disclosure.

Referring to FIG. 2A, the electric power steering apparatus may include a processor 200. The processor 200 has an associated non-transitory memory storing software instructions which, when executed by the processor 200, provides the functionalities of assistance adjustment condition determination unit 210, a critical collision steering angle determination module 220, and an assistance adjustment module 230.

The assistance adjustment condition determination module 210 of the processor 200 may determine whether an assistance adjustment condition is satisfied on the basis of whether there is a possibility of the vehicle colliding with an object in front of or beside the vehicle.

In this case, the object in front and the object to the side may be, for example, guard rails, other vehicles, and pedestrians. Further, the object to the side conceptually includes an object moving from the front or the rear to the side with respect to the vehicle.

As an example, when it is determined that there is no possibility that the vehicle will collide with the object in front and that there is a possibility that the vehicle will collide with the object to the side, the assistance adjustment condition determination module 210 may determine that the assistance adjustment condition is satisfied.

First, in order to satisfy the assistance adjustment condition, it should be determined that the front safety of the vehicle is guaranteed, that is, that there is no possibility that the vehicle will collide with the object in front. When there is a possibility that the vehicle will collide with the object in front, the driver of the vehicle attempts to move left or right to avoid the collision with the object in front. In this case, the driver may be regarded as choosing a collision with the object to the side rather than choosing the collision with the object in front, by his or her own intention, and thus there is no need to adjust the assistance.

Further, in order to satisfy the assistance adjustment condition, it should be determined that there is a possibility that the vehicle will collide with the object to the side, that is, that there is a possibility that the vehicle will collide with the object to the side when the vehicle moves left or right along with the change of the steering of the vehicle. This is because when the steering is changed but the vehicle does not collide with the object to the side, there is no need to restrict the steering to avoid the collision.

For example, when an obstacle (e.g., other vehicles, guard rails, and bumps) is on the left or right of the vehicle, when another vehicle is oncoming in a left or right lane with respect to the vehicle, or when another vehicle is traveling faster than the vehicle behind and to the side of the vehicle, it may be determined that there is a possibility that the vehicle will collide with the object to the side.

However, even in such a situation, the assistance adjustment condition determination module 210 does not necessarily determine that the assistance adjustment condition is satisfied. As another example, when the vehicle satisfies one or more of the following cases, the assistance adjustment condition determination module 210 may determine that the assistance adjustment condition is not satisfied when there is no possibility that the vehicle will collide with the object in front and there is a possibility that the vehicle will collide with the object to the side. Accordingly, the assistance adjustment condition determination module 210 allows a driver to change the steering according to his or her intention.

1) Case in which it is Determined that a Collision with an Object in Front Cannot be Avoided This is because even when it is determined that a collision with an object in front cannot be avoided, a driver changing the steering to make a collision with an object to a side may be regarded as selecting the collision with the object to the side rather than the collision with the object in front.

2) Case in which a Vehicle is Stopped.

This is because when a vehicle is not traveling but is stopped, there are no changes in collision possibility and in impact generated during the collision although the steering of the vehicle is changed.

3) Case in which Tire Slipping has Occurred Over a Predetermined Period of Time

This is because when tire slipping has occurred over a predetermined period of time, another collision may be made. Thus, there is a need to change the steering of the vehicle to exit the slipping state. For example, when slipping has occurred in a vehicle running on a slippery road due to rain or snow, the vehicle may travel in a direction different from a driver's target steering direction to cause a collision with an external object.

4) Case in which an Ambient Environment Recognition Apparatus has Failed.

A vehicle may include various types of ambient environment recognition apparatuses for recognizing ambient environments of the vehicle. For example, the ambient environment recognition apparatuses may include a radar for detecting an object in front of or beside the vehicle, an ultrasonic sensor for detecting an external object using ultrasonic waves that are emitted and then reflected, a camera for capturing image information for analyzing an ambient environment, and a precipitation detection sensor for obtaining a current weather condition (e.g., rain/snow).

When it is determined that such an ambient environment recognition apparatus has failed, the vehicle cannot accurately recognize the presence of an object in front of or beside the vehicle. Thus, it is not possible to accurately obtain the possibility of colliding with the object in front or to a side. Accordingly, it is also not possible to determine to what degree the assistance will be adjusted when the steering of the vehicle is changed.

5) Case in which a Sensor has Failed

For example, a steering angle sensor or a torque sensor may have failed. In this case, when a sensor installed in the vehicle has failed, it is not possible to accurately recognize the possibility of colliding with the object in front or to a side, and thus it is not possible to accurately calculate the steering angle of the vehicle.

6) Case in which a Failure has Occurred so that the Traveling of the Vehicle Cannot be Maintained For example, when the air pressure of a tire becomes less than a critical air pressure, when an abnormality has occurred in an engine, when an abnormality has occurred in an electric power steering (EPS) so that the steering assistance itself is impossible, or when an abnormality has occurred in a speed sensor so that a current vehicle speed cannot be accurately obtained, it may be considered that the failure is so significant that the vehicle cannot continue to travel. When such a significant failure has occurred so that the vehicle cannot continue to travel, it is necessary to quickly move the vehicle to a safe region. Accordingly, by adjusting the assistance, the vehicle should not be restricted from moving to the side.

When the assistance adjustment condition determination module 210 determines that the assistance adjustment condition is satisfied, the critical collision steering angle determination module 220 of the processor 200 may determine a critical collision steering angle at which the vehicle may collide with an object beside the vehicle.

In this case, when the steering of the vehicle is controlled, the steering may be performed largely in two directions, that is, to the left and right. Thus, when the steering angles are compared, it is not necessary to simply compare the values of the angles, but it is necessary to simultaneously perform comparison on both of the directions of the steering angles (left or right) and the absolute values of the steering angles (in degrees).

It is assumed that the steering angle of the vehicle has the same direction as the above-described critical collision steering angle and the steering angle of the vehicle has a greater absolute value than the critical collision steering angle. In this case, when the vehicle continues to travel while maintaining the current steering angle, the vehicle collides with the object to the side.

However, it is assumed that the direction of the steering angle of the vehicle is opposite to the direction of the critical collision steering angle, or the absolute value of the steering angle of the vehicle is smaller than the absolute value of the critical collision steering angle. In this case, although the vehicle continues to travel while maintaining the current steering angle, the vehicle does not collide with the object to the side. This will be described in detail below with reference to FIG. 3.

The assistance adjustment module 230 of the processor 200 may adjust the assistance on the basis of the critical collision steering angle determined by the critical collision steering angle determination module 220.

As an example, when the direction of the steering angle of the vehicle is the same as the direction of the critical collision steering angle and the absolution value of the steering angle of the vehicle is greater than or equal to the absolute value of the critical collision steering angle, the assistance adjustment module 230 may restrict the assistance. This is because the vehicle may collide with the object to the side when the vehicle continues to travel while maintaining the current steering angle of the vehicle.

In this case, the driver cannot be assisted in the steering wheel, and thus the steering is weighted so that the driver cannot maintain the current steering angle of the vehicle. Thus, the absolute value of the steering angle of the vehicle becomes less than the absolute value of the critical collision steering angle. Accordingly, the vehicle may avoid the collision with the object to the side.

As another example, when the direction of the steering angle of the vehicle is the same as the direction of the critical collision steering angle and the absolute value of the steering angle of the vehicle is less than the absolute value of the critical collision steering angle, the assistance adjustment module 230 may adjust the assistance to gradually decrease. In this case, the vehicle is not expected to collide with the object to the side. However, when the driver further turns the steering of the vehicle in the same direction as the current steering angle direction, there is a possibility of colliding with the object to the side. Accordingly, in order to prevent such a situation, it is necessary to reduce the assistance compared to the case in which there is no possibility of colliding with the object to the side. Accordingly, when the driver further steers the vehicle, the driver gradually feels that the steering of the vehicle becomes weighted. Thus, it is possible to avoid the collision with the object to the side.

As an example of the method of reducing the assistance, the assistance adjustment module 230 may determine the assistance on the basis of an assistance mask value determined according to the steering angle of the vehicle and a basic steering angle versus assistance graph.

In a general traveling situation in which the assistance adjustment condition is not satisfied, an assistance value according to the steering angle of the vehicle may be determined by the predetermined basic steering angle versus assistance graph. It is possible to decrease the assistance by multiplying an assistance mask value ranging from 0 to 1 by the assistance value derived using the basic steering angle versus assistance graph.

In this case, the above-described assistance mask value may be determined according to the steering angle of the vehicle and may be determined by a predetermined lookup table or graph.

A process of applying the assistance mask value will be described in detail below with reference to FIG. 4.

Figure 2B:
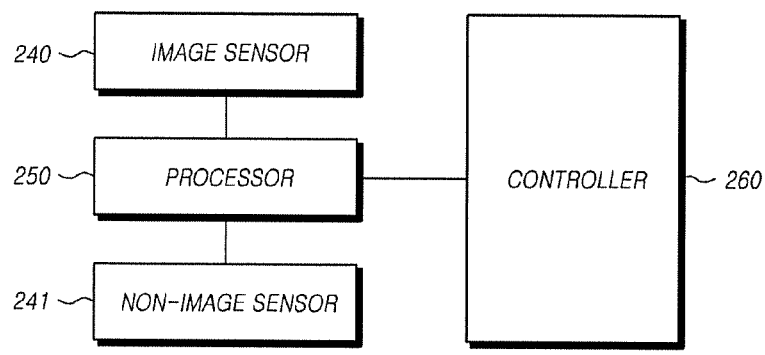
FIG. 2B is a block diagram showing components of a vehicle steering control system according to an embodiment of the present disclosure.

FIG. 2B is a block diagram showing components of a vehicle steering control system according to an embodiment of the present disclosure.

Referring to FIG. 2B, the vehicle steering control system may include an image sensor 240, a non-image sensor 241, a processor 250, and a controller 260.

The controller 260 may be an electric circuitry that executes instructions of software which thereby performs various tasks described hereinafter. The controller 260 may include at least one memory and at least one processor programmed to perform such tasks. In some examples the at least one processor may be used to implement the functions of both the processor 250 and the controller 260.

The image sensor 240 may be disposed in the vehicle to provide visibility to the outside of the vehicle and may be configured to capture image data. In this case, the outside of the vehicle may refer to at least one of a front region, a lateral region, and a rear region with respect to the vehicle.

The image sensor 240 may acquire an image regarding the outside of the vehicle on a per-frame basis. As an example, the image sensor 240 may be implemented with a complementary metal-oxide semiconductor (CMOS) camera or a charge-coupled device (CCD) camera. However, this is merely an example, and the present disclosure is not limited to a specific type of device as long as the device can acquire an image regarding the outside.

Image information imaged by the image sensor 240 is composed of image data and thus may refer to image data captured by the image sensor 240. Hereinafter, the image information imaged by the image sensor 240 refers to image data captured by the image sensor 240.

The image captured by the image sensor 240 may be generated in a format selected from among, for example, Audio-Video Interleave (AVI) Raw, Moving Picture Experts Group (MPEG)-4, H.264, DivX, and Joint Photographic Experts Group (JPEG). The image data captured by the image sensor 240 may be processed by the processor 250.

The non-image sensor 241 may be disposed in the vehicle to have a region for monitoring the outside of the vehicle and may be configured to capture sensing data. In this case, the outside of the vehicle may refer to at least one of a front region, a lateral region, and a rear region with respect to the vehicle.

As an example, the non-image sensor 241 may be implemented with a radar, a light detection and ranging (Lidar), or an ultrasonic sensor. However, this is merely an example, and the present disclosure is not limited to a specific type of device as long as the device can acquire sensing data regarding the outside of the vehicle.

As an example, the sensing data captured by the non-image sensor 241 may be processed by the processor 250 to be described below, and the controller 260 to be described below may be used to determine whether there is a possibility of the vehicle colliding with an object in front of or beside the vehicle.

The processor 250 may be configured to process the image data captured by the image sensor 240 and may be configured to process sensing data captured by the non-image sensor 241.

The processor 250 may be implemented using at least one electrical unit capable of processing image data or performing other functions, such as application specific integrated circuits (ASICs), digital signal processors (DSPs), digital signal processing devices (DSPDs), programmable logic devices (PLDs), field programmable gate arrays (FPGAs), processors, controllers, microcontrollers, and microprocessors.

The controller 260 may be configured to adjust an assistance value according to the steering angle of the vehicle, at least partially on the basis of the image data and the sensing data processed by the processor 250.

The controller 260 may determine whether there is a possibility of the vehicle colliding with an object in front of or beside the vehicle.

In this case, the object in front and the object to the side may be, for example, guardrails, other vehicles, and pedestrians. Further, the object to the side conceptually includes an object moving from the front or the rear to the side with respect to the vehicle.

Further, the controller 260 may determine whether the assistance adjustment condition is satisfied on the basis of whether there is a possibility of the vehicle colliding with an object in front of or beside the vehicle.

As an example, when it is determined that there is no possibility that the vehicle will collide with the object in front and that there is a possibility that the vehicle will collide with the object to the side, the controller 260 may determine that the assistance adjustment condition is satisfied.

First, in order to satisfy the assistance adjustment condition, it should be determined that the front safety of the vehicle is guaranteed, that is, that there is no possibility that the vehicle will collide with the object in front. When there is a possibility that the vehicle will collide with the object in front, the driver of the vehicle attempts to move left or right to avoid the collision with the object in front. In this case, the driver may be regarded as choosing a collision with the object to the side rather than choosing the collision with the object in front, by his or her own intention, and thus there is no need to adjust the assistance.

Further, in order to satisfy the assistance adjustment condition, it should be determined that there is a possibility that the vehicle will collide with the object to the side, that is, that there is a possibility that the vehicle will collide with the object to the side when the vehicle moves left or right along with the change of the steering of the vehicle. This is because when the steering is changed but the vehicle does not collide with the object to the side, there is no need to restrict the steering to avoid the collision.

For example, when an obstacle (e.g., other vehicles, guardrails, and bumps) is on the left or right of the vehicle, when another vehicle is oncoming in a left or right lane with respect to the vehicle, or when another vehicle is traveling faster than the vehicle behind and to the side of the vehicle, it may be determined that there is a possibility that the vehicle will collide with the object to the side.

However, even in such a situation, the controller 260 does not necessarily determine that the assistance adjustment condition is satisfied.

As another example, when the vehicle satisfies one or more of the following cases, the controller 260 may determine that the assistance adjustment condition is not satisfied although there is no possibility that the vehicle will collide with the object in front and there is a possibility that the vehicle will collide with the object to the side. Accordingly, the controller 260 allows a driver to change the steering according to his or her intention.

1) Case in which it is Determined that a Collision with an Object in Front Cannot be Avoided.

This is because when it is determined that a collision with an object in front cannot be avoided, even a driver changing the steering to make a collision with an object to a side may be regarded as selecting the collision with the object to the side rather than the collision with the object in front.

2) Case in which a Vehicle is Stopped.

This is because when a vehicle is not traveling but is stopped, there are no changes in collision possibility and in impact generated during the collision although the steering of the vehicle is changed.

3) Case in which Tire Slipping has Occurred Over a Predetermined Period of Time.

This is because when tire slipping has occurred over a predetermined period of time, another collision may occur. Thus, there is a need to change the steering of the vehicle to exit the slipping state. For example, when slipping has occurred in a vehicle running on a slippery road due to rain or snow, the vehicle may travel in a direction different from a driver's target steering direction to cause a collision with an external object.

4) Case in which an Ambient Environment Recognition Apparatus has Failed.

A vehicle may include various types of ambient environment recognition apparatuses for recognizing ambient environments of the vehicle. For example, the ambient environment recognition apparatuses may include a radar for detecting an object in front of or beside the vehicle, an ultrasonic sensor for detecting an external object using ultrasonic waves that are emitted and then reflected, a camera for capturing image information for analyzing an ambient environment, and a precipitation detection sensor for acquiring a current weather condition (e.g., rain/snow).

When it is determined that such an ambient environment recognition apparatus has failed, the vehicle cannot accurately recognize the presence of an object in front of or beside the vehicle. Thus, it is not possible to accurately obtain the possibility of colliding with the object in front or to the side. Accordingly, it is also not possible to determine to what degree the assistance will be adjusted when the steering of the vehicle is changed.

5) Case in which a Sensor has Failed.

For example, a steering angle sensor or a torque sensor may have failed. In this case, when a sensor installed in the vehicle has failed, it is not possible to accurately recognize the possibility of colliding with an object in front or to a side, and thus it is not possible to accurately calculate the steering angle of the vehicle.

6) Case in which a Failure has Occurred so that the Traveling of the Vehicle Cannot be Maintained.

For example, when the air pressure of a tire becomes less than a critical air pressure, when an abnormality has occurred in an engine, when an abnormality has occurred in an EPS so that the steering assistance itself is impossible, or when an abnormality has occurred in a speed sensor so that a current vehicle speed cannot be accurately obtained, it may be considered that the failure is so significant that the vehicle cannot continue to travel. When such a significant failure has occurred so that the vehicle cannot continue to travel, it is necessary to quickly move the vehicle to a safe region.

Accordingly, by adjusting the assistance, the vehicle should not be restricted from moving to the side.

Further, when it is determined that the above-described assistance adjustment condition is satisfied, the controller 260 may determine a critical collision steering angle at which the vehicle may collide with the object to the side.

As described with reference to FIG. 2A, when the steering of the vehicle is controlled, the steering may be made largely in two directions, that is, to the left and right. Thus, when the steering angles are compared, it is not necessary to simply compare the values of the angles, but it is necessary to simultaneously perform comparison on both of the directions of the steering angles (left or right) and the absolute values of the steering angles (in degrees).

It is assumed that the steering angle of the vehicle has the same direction as the above-described critical collision steering angle and the steering angle of the vehicle has a greater absolute value than the critical collision steering angle. In this case, when the vehicle continues to travel while maintaining the current steering angle, the vehicle collides with the object to the side.

However, it is assumed that the direction of the steering angle of the vehicle is opposite to the direction of the critical collision steering angle, or the absolute value of the steering angle of the vehicle is smaller than the absolute value of the critical collision steering angle. In this case, although the vehicle continues to travel while maintaining the current steering angle, the vehicle does not collide with the object to the side.

Further, the controller 260 may adjust an assistance value according to the steering angle of the vehicle on the basis of the above-described critical collision steering angle.

As an example, when the direction of the steering angle of the vehicle is the same as the direction of the critical collision steering angle and the absolution value of the steering angle of the vehicle is greater than or equal to the absolute value of the critical collision steering angle, the controller 260 may restrict the assistance. This is because the vehicle may collide with the object to the side when the vehicle continues to travel while maintaining the current steering angle of the vehicle.

In this case, the driver cannot be assisted in the steering wheel, and thus the steering is weighted so that the driver cannot maintain the current steering angle of the vehicle. Thus, the absolute value of the steering angle of the vehicle becomes less than the absolute value of the critical collision steering angle. Accordingly, the vehicle may avoid the collision with the object to the side.

As another example, when the direction of the steering angle of the vehicle is the same as the direction of the critical collision steering angle and the absolute value of the steering angle of the vehicle is less than the absolute value of the critical collision steering angle, the controller 260 may adjust the assistance to gradually decrease. In this case, the vehicle is not expected to collide with the object to the side. However, when the driver further turns the steering of the vehicle in the same direction as the current steering angle direction, there is a possibility of colliding with the object to the side. Accordingly, in order to prevent such a situation, it is necessary to reduce the assistance compared to the case in which there is no possibility of colliding with the object to the side. Accordingly, when the driver further steers the vehicle, the driver gradually feels that the steering of the vehicle becomes weighted. Thus, it is possible to avoid the collision with the object to the side.

As an example of the method of reducing the assistance, the controller 260 may determine the assistance on the basis of an assistance mask value determined according to the steering angle of the vehicle and a basic steering angle versus assistance graph.

In a general traveling situation in which the assistance adjustment condition is not satisfied, an assistance value according to the steering angle of the vehicle may be determined by the predetermined basic steering angle versus assistance graph. It is possible to decrease the assistance by multiplying an assistance mask value ranging from 0 to 1 by the assistance value derived using the basic steering angle versus assistance graph.

In this case, the above-described assistance mask value may be determined according to the steering angle of the vehicle and may be determined by a predetermined lookup table or graph.

Figure 2C:
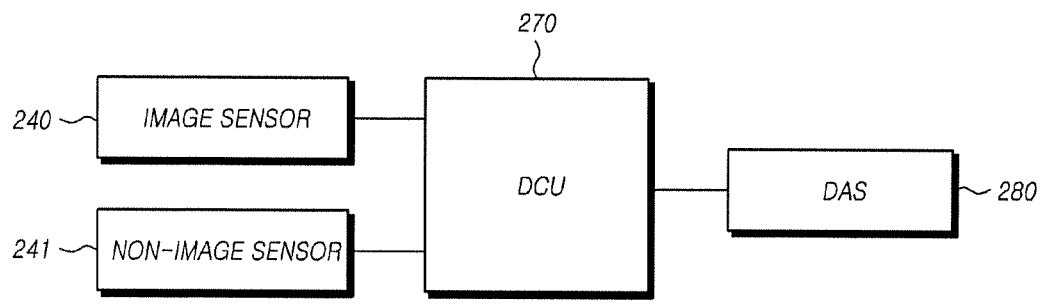
FIG. 2C is a block diagram showing components of a vehicle steering control system having a domain control unit according to an embodiment of the present disclosure.

FIG. 2C is a block diagram showing components of a vehicle steering control system having a domain control unit according to an embodiment of the present disclosure.

Referring to FIG. 2C, the image sensor 240 and the non-image sensor 241 may be substantially the same as those described in FIG. 2B.

The domain control unit (DCU) 270 may be an electric circuitry that executes instructions of software which thereby performs various tasks described hereinafter. The DCU 270 may include at least one memory and at least one processor programmed to perform such tasks.

The DCU 270 may control the entire operation of the steering control apparatus of the vehicle. The DCU 270 may be configured to receive captured image data from at least one image sensor 240, receive captured sensing data from the non-image sensor 241, and process at least one of the image data and the sensing data. For the purpose of the processing, the DCU 270 may include at least one processor.

The DCU 270 may communicate with at least one image sensor 240 and non-image sensor 241 provided in the vehicle. To this end, an appropriate data link or communication link such as a vehicle network bus for data transmission or signal transmission may be further included.

The DCU 270 may be operable to control one or more driver assistance systems (DASs) 280 which are used in the vehicle. Based on sensing data captured by one or more non-image sensors and image data captured by one or more image sensors, the DCU 270 may control DASs such as a blind spot detection (BSD) system, an adaptive cruise control (ACC) system, a lane departure warning system (LDWS), a lane keeping assist system (LKAS), and a lane change assist system (LCAS).

The DCU 270 may determine whether there is a possibility of the vehicle colliding with an object in front or to a side.

In this case, the object in front or to the side may be, for example, guardrails, other vehicles, and pedestrians. Further, the object to the side conceptually includes an object moving from the front or the rear to the side with respect to the vehicle.

Moreover, the DCU 270 may determine whether the assistance adjustment condition is satisfied on the basis of whether there is a possibility of the vehicle colliding with the object in front or to a side.

As an example, when it is determined that there is no possibility that the vehicle will collide with the object in front and that there is a possibility that the vehicle will collide with the object to the side, the DCU 270 may determine that the assistance adjustment condition is satisfied.

First, in order to satisfy the assistance adjustment condition, it should be determined that the front safety of the vehicle is guaranteed, that is, that there is no possibility that the vehicle will collide with the object in front. When there is a possibility that the vehicle will collide with the object in front, the driver of the vehicle attempts to move left or right to avoid the collision with the object in front. In this case, the driver may be regarded as choosing a collision with the object to the side rather than choosing the collision with the object in front, by his or her own intention, and thus there is no need to adjust the assistance.

Further, in order to satisfy the assistance adjustment condition, it should be determined that there is a possibility that the vehicle will collide with the object to the side, that is, that there is a possibility that the vehicle will collide with the object to the side when the vehicle moves left or right along with the change of the steering of the vehicle. This is because when the steering is changed but the vehicle does not collide with the object to the side, there is no need to restrict the steering to avoid the collision.

For example, when an obstacle (e.g., other vehicles, guardrails, and bumps) is on the left or right of the vehicle, when another vehicle is oncoming in a left or right lane with respect to the vehicle, or when another vehicle is traveling faster than the vehicle behind and to the side of the vehicle, it may be determined that there is a possibility that the vehicle will collide with the object to the side.

However, even in such a situation, the DCU 270 does not necessarily determine that the assistance adjustment condition is satisfied.

As another example, when the vehicle satisfies one or more of the following cases, the DCU 270 may determine that the assistance adjustment condition is not satisfied although there is no possibility that the vehicle will collide with the object in front and there is a possibility that the vehicle will collide with the object to the side. Accordingly, the DCU 270 allows a driver to change the steering according to his or her intention.

1) Case in which it is Determined that a Collision with an Object in Front Cannot be Avoided This is because when it is determined that a collision with an object in front cannot be avoided, even a driver changing the steering to make a collision with an object to a side may be regarded as selecting the collision with the object to the side rather than the collision with the object in front.

2) Case in which a Vehicle is Stopped.

This is because when a vehicle is not traveling but is stopped, there are no changes in collision possibility and in impact generated during the collision although the steering of the vehicle is changed.

3) Case in which Tire Slipping is Generated Over a Predetermined Period of Time

This is because when tire slipping is generated over a predetermined period of time, another collision may be made. Thus, there is a need to change the steering of the vehicle to exit the slipping state. For example, when slipping has occurred in a vehicle running on a slippery road due to rain or snow, the vehicle may travel in a direction different from a driver's target steering direction to cause a collision with an external object.

4) Case in which an Ambient Environment Recognition Apparatus has Failed.

A vehicle may include various types of ambient environment recognition apparatuses for recognizing ambient environments of the vehicle. For example, the ambient environment recognition apparatuses may include a radar for detecting an object in front of or beside the vehicle, an ultrasonic sensor for detecting an external object using ultrasonic waves that are emitted and then reflected, a camera for capturing image information for analyzing an ambient environment, and a precipitation detection sensor for acquiring a current weather condition (e.g., rain/snow).

When it is determined that such an ambient environment recognition apparatus has failed, the vehicle cannot accurately recognize the presence of an object in front of or beside the vehicle. Thus, it is not possible to accurately obtain the possibility of colliding with the object in front or to a side. Accordingly, it is also not possible to determine to what degree the assistance will be adjusted when the steering of the vehicle is changed.

5) Case in which a Sensor has Failed

For example, a steering angle sensor or a torque sensor may have failed. In this case, when a sensor installed in the vehicle has failed, it is not possible to accurately recognize the possibility of colliding with an object in front or to a side, and thus it is not possible to accurately calculate the steering angle of the vehicle.

6) Case in which a Failure has Occurred so that the Traveling of the Vehicle Cannot be Maintained For example, when the air pressure of a tire becomes less than a critical air pressure, when an abnormality has occurred in an engine, when an abnormality has occurred in an EPS so that the steering assistance itself is impossible, or when an abnormality has occurred in a speed sensor so that a current vehicle speed cannot be accurately obtained, it may be considered that the failure is so significant that the vehicle cannot continue to travel. When such a significant failure has occurred so that the vehicle cannot continue to travel, it is necessary to quickly move the vehicle to a safe region. Accordingly, by adjusting the assistance, the vehicle should not be restricted from moving to the side.

Further, when it is determined that the above-described assistance adjustment condition is satisfied, the DCU 270 may determine a critical collision steering angle at which the vehicle may collide with the object to the side.

As described with reference to FIG. 2A, when the steering of the vehicle is controlled, the steering may be made largely in two directions, that is, to the left and right. Thus, when the steering angles are compared, it is not necessary to simply compare the values of the angles, but it is necessary to simultaneously perform comparison on both of the directions of the steering angles (left or right) and the absolute values of the steering angles (in degrees).

It is assumed that the steering angle of the vehicle has the same direction as the above-described critical collision steering angle and the steering angle of the vehicle has a greater absolute value than the critical collision steering angle. In this case, when the vehicle continues to travel while maintaining the current steering angle, the vehicle collides with the object to the side.

However, it is assumed that the direction of the steering angle of the vehicle is opposite to the direction of the critical collision steering angle, or the absolute value of the steering angle of the vehicle is smaller than the absolute value of the critical collision steering angle. In this case, although the vehicle continues to travel while maintaining the current steering angle, the vehicle does not collide with the object to the side.

Further, the DCU 270 may adjust an assistance value according to the steering angle of the vehicle on the basis of the above-described critical collision steering angle.

As an example, when the direction of the steering angle of the vehicle is the same as the direction of the critical collision steering angle and the absolution value of the steering angle of the vehicle is greater than or equal to the absolute value of the critical collision steering angle, the DCU 270 may restrict the assistance. This is because the vehicle may collide with the object to the side when the vehicle continues to travel while maintaining the current steering angle of the vehicle.

In this case, the driver cannot be assisted in the steering wheel, and thus the steering is weighted so that the driver cannot maintain the current steering angle of the vehicle. Thus, the absolute value of the steering angle of the vehicle becomes less than the absolute value of the critical collision steering angle. Accordingly, the vehicle may avoid the collision with the object to the side.

As another example, when the direction of the steering angle of the vehicle is the same as the direction of the critical collision steering angle and the absolute value of the steering angle of the vehicle is less than the absolute value of the critical collision steering angle, the DCU 270 may adjust the assistance to gradually decrease. In this case, the vehicle is not expected to collide with the object to the side. However, when the driver further turns the steering of the vehicle in the same direction as the current steering angle direction, there is a possibility of colliding with the object to the side. Accordingly, in order to prevent such a situation, it is necessary to reduce the assistance compared to the case in which there is no possibility of colliding with the object to the side. Accordingly, when the driver further steers the vehicle, the driver gradually feels that the steering of the vehicle becomes weighted. Thus, it is possible to avoid the collision with the object to the side.

As an example of the method of reducing the assistance, the DCU 270 may determine the assistance on the basis of an assistance mask value determined according to the steering angle of the vehicle and a basic steering angle versus assistance graph.

In a general traveling situation in which the assistance adjustment condition is not satisfied, the assistance value according to the steering angle of the vehicle may be determined by the predetermined basic steering angle versus assistance graph. It is possible to decrease the assistance by multiplying an assistance mask value ranging from 0 to 1 by the assistance value derived using the basic steering angle versus assistance graph.

Figure 3:
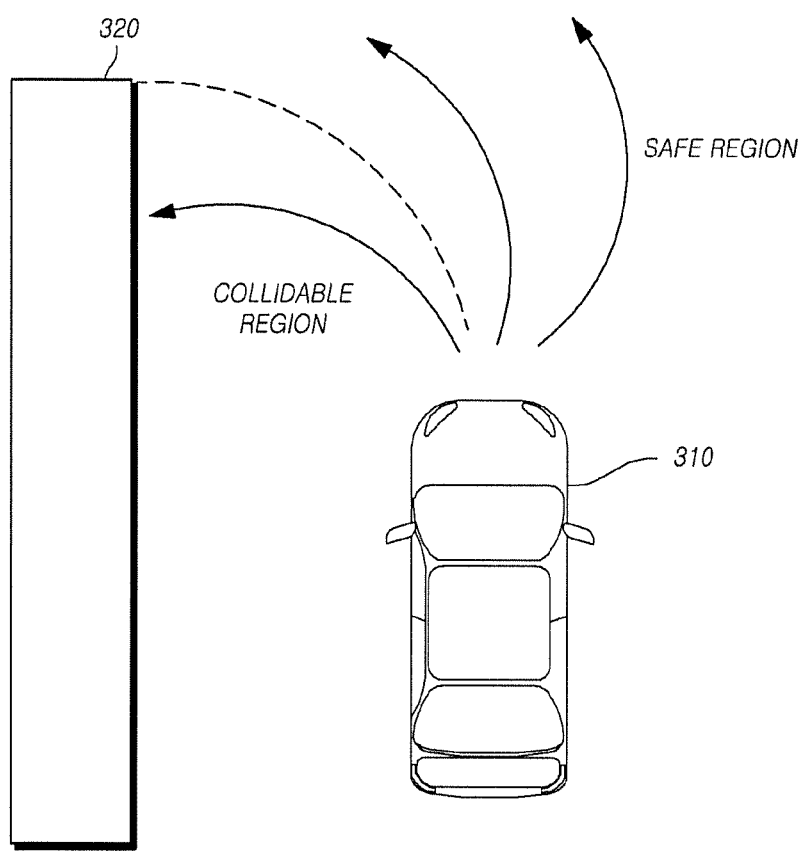
FIG. 3 shows the possibility of colliding with an object to a side depending on the steering angle of the vehicle according to an embodiment of the present disclosure.

FIG. 3 shows the possibility of colliding with an object to a side depending on the steering angle of the vehicle according to an embodiment of the present disclosure.

Referring to FIG. 3, a guardrail 320 is present on the left of a vehicle 310. When a driver of the vehicle 310 turns the steering of the vehicle 310 to the left, the vehicle 310 turns left so that a collision with the guardrail 320 may occur.

In this case, when the vehicle 310 further turns left with respect to a dotted line, the vehicle 310 may be located in a collidable region to collide with the guardrail 320. However, when the vehicle 310 turns right with respect to a dotted line, the vehicle 310 may be located in a safe region to avoid the collision with the guardrail 320. In this case, the steering angle of the vehicle at which the vehicle 310 moves along a path indicated by the dotted line is a critical collision steering angle.

Figure 4:
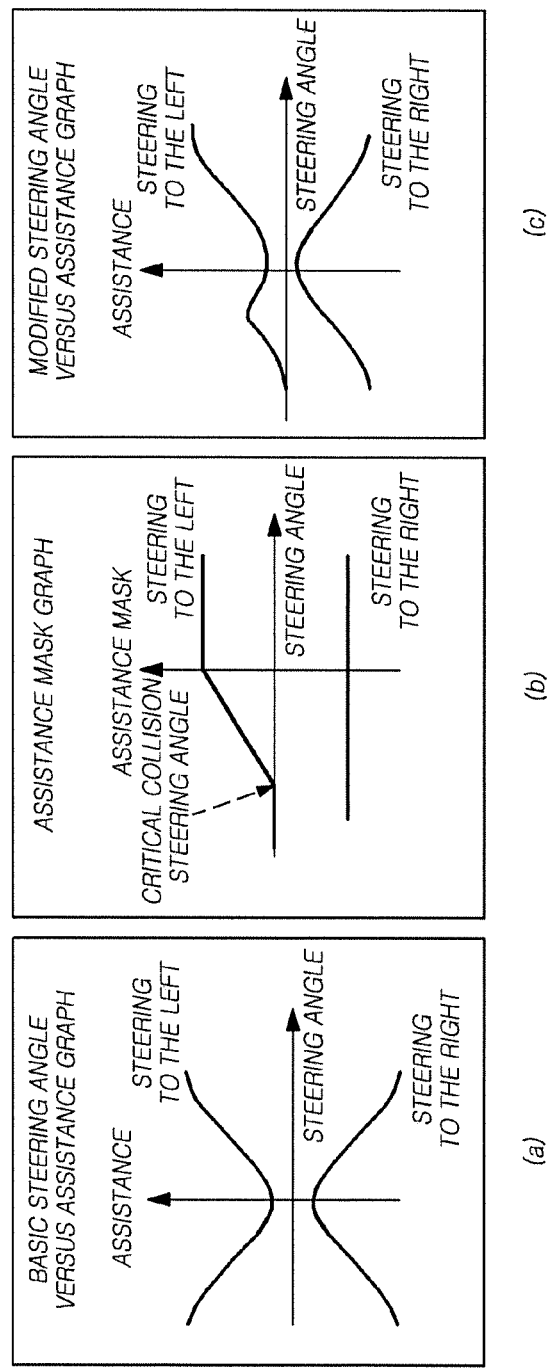
FIG. 4 shows a change in a steering angle versus assistance graph according to the possibility of a vehicle colliding with an object to a side according to an embodiment of the present disclosure.

FIG. 4 shows a change in a steering angle versus assistance graph according to the possibility of the vehicle colliding with an object to a side according to an embodiment of the present disclosure.

A basic steering angle versus assistance graph is shown in a portion (a) of the FIG. 4.

As described above, the basic steering angle versus assistance graph is a graph for determining an assistance value according to the steering angle of the vehicle in a general driving situation in which an assistance adjustment condition is not satisfied.

In this graph, an x axis refers to a steering angle, and with respect to an origin, (−) refers to a left direction, and (+) refers to a right direction. Also, a y axis refers to an assistance value, and (+) refers to an assistance value in the left direction, and (−) refers to an assistance value in the right direction.

In the general vehicle steering process, in order to maintain the steering angle of the vehicle in an origin state, the assistance value decreases to weight the steering wheel as the steering angle of the vehicle decreases to approach the origin while the assistance value increases to lighten the steering wheel as the steering angle of the vehicle increases. Accordingly, the basic steering angle versus assistance graph has a curved shape in which the absolute value of the assistance decreases as the steering wheel approaches the origin.

Further, the steering of the vehicle includes left steering and right steering, and thus there may be two curves in the graph. When the vehicle is steered to the left, assistance may be provided to the left, and thus an assistance value is determined by the curve in the side (+), that is, in an upper portion of the graph. When the vehicle is steered to the right, assistance may be provided to the right, and thus an assistance value is adjusted by the curve in the side (−), that is, in a lower portion of the graph.

An assistance mask graph determined according to whether there is a possibility of the vehicle colliding with an object to a side when the vehicle is steered to the left is shown in a portion (b) of FIG. 4.

The assistance mask graph is a graph for determining an assistance mask value to be multiplied to the assistance value derived from the basic steering angle versus assistance graph as described above with reference to FIG. 2.

In this graph, an x axis refers to a steering angle, and with respect to an origin, (−) refers to a left direction, and (+) refers to a right direction. Also, a y axis refers to an assistance mask value, and (+) refers to an assistance mask value in the left direction, and (−) refers to an assistance mask value in the right direction. In this case, the absolute value of the assistance mask may range from 0 to 1. The absolute value of the assistance mask being 0 refers to a case in which the assistance is restricted, that is, a case in which a driver may control the steering without help of a motor attached to a steering shaft. The absolute value of the assistance mask being 1 refers to a case in which the steering is assisted on the basis of the assistance value derived from the basic steering angle versus assistance graph.

Even in the assistance mask graph, the vehicle may be steered to the left and may be steered to the right. Thus, there are two lines. When the vehicle is steered to the left, assistance may be provided to the left, and thus an assistance mask value is determined by the line in the side (+), that is, in an upper portion of the graph. When the vehicle is steered to the right, assistance may be provided to the right, and thus an assistance mask value is determined by the line in the side (−), that is, in a lower portion of the graph.

For the portion (b) of FIG. 4, when the current steering angle of the vehicle is in the right direction or when the current steering angle of the vehicle is in the left direction and the driver changes the steering to the right, the assistance mask value is maintained as 1. However, when the current steering angle of the vehicle is in the left direction and the driver changes the steering to the left, the assist value should be decreased and the steering should be weighted in order to prevent a collision with an object to a side, as described above.

In this case, when the absolute value of the steering angle of the vehicle is greater than or equal to the absolute value of the above-described critical collision steering angle, the assistance mask value becomes 0. That is, the assistance is restricted.

On the other hand, when the absolute value of the steering angle of the vehicle is less than the absolute value of the above-described critical collision steering angle, the assistance mask value is inversely proportional to the absolute value of the steering angle of the vehicle. That is, as the steering of the vehicle is turned to the left, the assistance mask value decreases so that the driver feels that the steering is weighted.

A modified steering angle versus assistance graph obtained by combining the graph shown in the portion (a) of FIG. 4 and the graph shown in the portion (b) of FIG. 4 is shown in a portion (c) of FIG. 4. The modified graph may be obtained by multiplying the assistance mask value determined in the portion (b) of FIG. 4 by the assistance value for the steering angle of the vehicle determined in the portion (a) of FIG. 4.

Referring to the portion (c) of FIG. 4, it can be seen that the assistance value further decreases in the modified steering angle versus assistance graph than in the basic steering angle versus assistance graph when the critical collision steering angle is in the left direction, and the vehicle is steered to the left; otherwise, the modified steering angle versus assistance graph has the same assistance values as the basic steering angle versus assistance graph.

Figure 5:
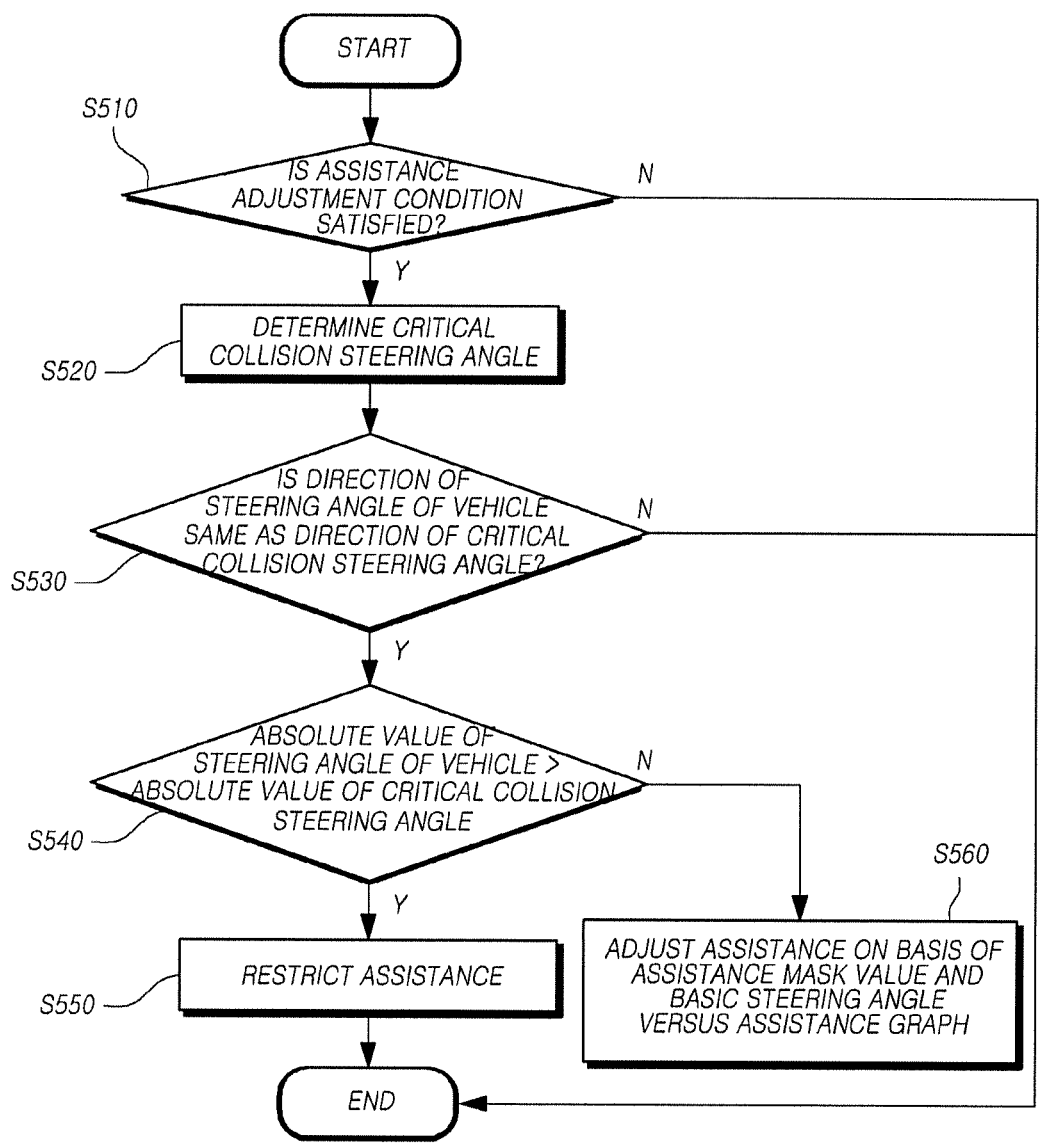
FIG. 5 is a flowchart showing a process of adjusting an assistance according to the steering of the vehicle on the basis of whether there is a possibility of a vehicle colliding with an object in front or to a side according to an embodiment of the present disclosure.

FIG. 5 is a flowchart showing a process of adjusting an assistance of an EPS apparatus on the basis of whether there is a possibility of a vehicle colliding with an object in front or to a side according to an embodiment of the present disclosure.

The following description shows an example in which the process is performed by the EPS described with reference to FIG. 2A.

An assistance adjustment condition determination module 210 of the EPS apparatus of the vehicle determines whether an assistance adjustment condition is satisfied on the basis of whether there is a possibility of the vehicle colliding with an object in front of or beside the vehicle (S510).

In this case, as described above with reference to FIG. 2, when it is determined that there is no possibility that the vehicle will collide with the object in front and there is a possibility that the vehicle will collide with the object to the side, the assistance adjustment condition determination module 210 may determine that the assistance adjustment condition is satisfied.

However, as described with reference to FIG. 2, when it is determined that the vehicle cannot avoid the collision with the object in front, when the vehicle is stopped, when slipping has occurred in the vehicle over a predetermined time of period, when a failure has occurred in an ambient environment recognition apparatus installed in the vehicle, when a failure has occurred in a sensor installed in the vehicle, or when a failure has occurred in which the traveling of the vehicle cannot be maintained, the assistance adjustment condition determination module 210 may determine whether the assistance adjustment condition is not satisfied.

In S510, when it is determined that the assistance adjustment condition is satisfied (Y in S510), a critical collision steering angle determination module 220 of the EPS apparatus of the vehicle determines a critical collision steering angle, which is a steering angle at which the vehicle may collide with an object to a side (S520).

In S520, an assistance adjustment module 230 of the EPS apparatus of the vehicle may adjust an assistance on the basis of a value of the critical collision steering angle determined in S520.

First, the assistance adjustment module 230 determines whether the steering angle of the vehicle is the same as the direction of the critical collision steering angle (S530). When the directions are the same as each other (Y in S530), the assistance adjustment module 230 compares the absolute value of the steering value of the vehicle and the absolute value of the critical collision steering angle (S540).

When the absolute value of the steering angle of the vehicle is greater than or equal to the absolute value of the critical collision steering angle (Y in S540), the assistance adjustment module 230 may restrict the assistance (S550). In this case, the driver should adjust the steering of the vehicle using only the driver's force because the steering cannot be assisted by the EPS apparatus. Accordingly, since it is not easy for the driver to maintain the steering of the vehicle so there is a possibility that the vehicle will collide with an object to a side, it is possible to reduce the possibility of colliding with the object to the side.

On the other hand, when the absolute value of the steering angle of the vehicle is less than the absolute value of the critical collision steering angle (N in S540), the assistance adjustment module 230 may adjust the assistance on the basis of the assistance mask value determined according to the steering angle of the vehicle and the basic steering angle versus assistance graph (S560). The assistance mask value and the basic steering angle versus assistance graph according to the steering angle of the vehicle and the critical collision steering angle follow the graph shown in FIG. 4.

According to the present disclosure, it is possible to avoid colliding with an object beside a vehicle when the steering of the vehicle is changed or to minimize impact generated upon the collision. In detail, by preventing a vehicle from colliding with an object to a side at high speed to delay the time it takes for a collision to occur, it is possible for a driver to directly prepare for the collision or for an automatic emergency braking (AEB) system to operate during the delay in order to stop the vehicle.

Even though all of the components of the above-described embodiments of the present disclosure have been described as being combined into a single component or as operating in combination, the present prevention is not necessarily limited to these embodiments. In other words, within the scope of the invention, all the elements may selectively combine into one or more elements to operate.

The above description is only illustrative of the technical idea of the present disclosure, and those skilled in the art will appreciate that various modifications, additions and substitutions are possible, without departing from the essential characteristics of the invention. Therefore, the embodiments disclosed herein are intended not to limit but to describe the technical spirit of the present disclosure, and the scope of the present disclosure is not limited to the embodiments. The scope of the invention should be construed by the appended claims, and all technical equivalents should be construed as included in the scope of the invention.

What is claimed is:

1. A steering control system of a vehicle, the steering control system comprising:
   an image sensor installed in the vehicle to have visibility to an outside of the vehicle and configured to capture image data;
   a non-image sensor installed in the vehicle to have a monitoring region for the outside of the vehicle and configured to capture sensing data;
   at least one processor configured to process the image data captured by the image sensor and the sensing data captured by the non-image sensor; and
   a controller configured to adjust an assistance value that controls an operational force of a steering wheel, according to a steering angle of the vehicle, at least partially based on the processing of the image data and the sensing data,
   wherein the controller is configured to determine whether there is a possibility of the vehicle colliding with an object to a side of the vehicle,
   wherein the controller is configured to determine whether an assistance adjustment condition is satisfied based on whether there is a possibility of the vehicle colliding with the object to the side,
   wherein the controller is configured to determine a critical collision steering angle at which the vehicle collides with the object to the side in response to determining that the assistance adjustment condition is satisfied,
   wherein the controller is configured to adjust the assistance value according to the steering angle of the vehicle based on the critical collision steering angle, and
   wherein in response to a case in which tire slipping has occurred in the vehicle over a predetermined period of time, the controller determines that the assistance adjustment condition is not satisfied and performs steering torque assisting control.

2. The steering control system of claim 1, wherein in response to determining that there is no possibility of colliding with the object in front and there is a possibility of colliding with the object to the side, the controller determines that the assistance adjustment condition is satisfied.

3. The steering control system of claim 1, wherein in response to at least one of a case in which the vehicle is stopped, a case in which a failure has occurred in an ambient environment recognition apparatus installed in the vehicle, a case in which a failure has occurred in a sensor installed in the vehicle, or a case in which a failure that does not allow the vehicle to travel has occurred, the controller further determines that the assistance adjustment condition is not satisfied.

4. The steering control system of claim 1, wherein in response to determining that a direction of the steering angle of the vehicle is equal to a direction of the critical collision steering angle and an absolute value of the steering angle of the vehicle is greater than or equal to an absolute value of the critical collision steering angle, the controller restricts the assistance value.

5. The steering control system of claim 1, wherein in response to determining that a direction of the steering angle of the vehicle is equal to a direction of the critical collision steering angle and an absolute value of the steering angle of the vehicle is less than an absolute value of the critical collision steering angle, the controller adjusts the assistance value that is calculated by multiplying an assistance weight value to a basic assistance value,
   wherein the basic assistance value is a predetermined assistance value at each steering angle, and increases as the steering angle increases when the vehicle is steered to left or right, and
   wherein the assistance weight value is a predetermined weight value at each steering angle, and is multiplied to the basic assistance value so as to obtain the adjusted assistance value, wherein the assistance weight value is obtained from a predetermined lookup table or graph of an assistance weight value at each steering angle.

6. The steering control system of claim 5, wherein the assistance weight value is inversely proportional to the absolute value of the steering angle of the vehicle.

7. The steering control system of claim 1, wherein in response to determining that the assistance adjustment condition is satisfied and a direction of the steering angle of the vehicle is equal to a direction of the critical collision steering angle, the controller adjusts the assistance value to be reduced compared to an assistance value in a driving situation in which the assistance adjustment condition is not satisfied.

8. A steering control system of a vehicle, the steering control system comprising:
   an image sensor installed in the vehicle to have visibility to an outside of the vehicle and configured to capture image data;
   a non-image sensor installed in the vehicle to have a monitoring region for the outside of the vehicle and configured to capture sensing data; and
   at least one processor configured to process the image data captured by the image sensor and the sensing data captured by the non-image sensor and to control at least one driver assistance system provided in the vehicle,
   wherein the at least one processor is configured to determine whether there is a possibility of the vehicle colliding with an object to a side of the vehicle,
   wherein the at least one processor is configured to determine whether an assistance adjustment condition is satisfied based on whether there is a possibility of the vehicle colliding with the object to the side,
   wherein the at least one processor is configured to determine a critical collision steering angle at which the vehicle collides with the object to the side in response to determining that the assistance adjustment condition is satisfied,
   wherein the at least one processor is configured to adjust an assistance value that controls an operation force of a steering wheel, according to a steering angle of the vehicle based on the critical collision steering angle, and
   wherein in response to a case in which tire slipping has occurred in the vehicle over a predetermined period of time, the at least one processor determines that the assistance adjustment condition is not satisfied and performs steering torque assisting control.

9. The steering control system of claim 8, wherein in response to determining that there is no possibility of colliding with the object in front and there is a possibility of colliding with the object to the side, the at least one processor determines that the assistance adjustment condition is satisfied.

10. The steering control system of claim 8, wherein in response to at least one of a case in which the vehicle is stopped, a case in which a failure has occurred in an ambient environment recognition apparatus installed in the vehicle, a case in which a failure has occurred in a sensor installed in the vehicle, or a case in which a failure that does not allow the vehicle to travel has occurred, the at least one processor further determines that the assistance adjustment condition is not satisfied.

11. The steering control system of claim 8, wherein in response to determining that a direction of the steering angle of the vehicle is equal to a direction of the critical collision steering angle and an absolute value of the steering angle of the vehicle is greater than or equal to an absolute value of the critical collision steering angle, the at least one processor restricts the assistance value.

12. The steering control system of claim 8, wherein in response to determining that a direction of the steering angle of the vehicle is equal to a direction of the critical collision steering angle and an absolute value of the steering angle of the vehicle is less than an absolute value of the critical collision steering angle, the at least one processor adjusts the assistance value that is calculated by multiplying an assistance weight value to a basic assistance value,
  wherein the basic assistance value is a predetermined assistance value at each steering angle, and increases as the steering angle increases when the vehicle is steered to left or right, and
  wherein the assistance weight value is a predetermined weight value at each steering angle, and is multiplied to the basic assistance value so as to obtain the adjusted assistance value, wherein the assistance weight value is obtained from a predetermined lookup table or graph of an assistance weight value at each steering angle.

13. A non-image sensor system, comprising a processor, installed in a vehicle to have a monitoring region for an outside of the vehicle and configured to capture sensing data, wherein the processor is configured to:
  process the sensing data to determine whether there is a possibility of the vehicle colliding with an object to a side of the vehicle, and
  determine whether an assistance adjustment condition is satisfied based on whether there is a possibility of the vehicle colliding with the object to the side,
  determine a critical collision steering angle at which the vehicle collides with the object to the side in response to determining that the assistance adjustment condition is satisfied, and
  adjust an assistance value that control an operation force of a steering wheel, according to a steering angle of the vehicle is adjusted based on the critical collision steering angle,
  wherein in response to a case in which tire slipping has occurred in the vehicle over a predetermined period of time, the processor determines that the assistance adjustment condition is not satisfied and performs steering torque assisting control.

14. An electric power steering apparatus of a vehicle, the electric power steering apparatus comprising a processor configured to:
  determine whether an assistance adjustment condition is satisfied based on whether there is a possibility of the vehicle colliding with an object to a side of the vehicle,
  determine a critical collision steering angle at which the vehicle collides with the object to the side in response to determining that the assistance adjustment condition is satisfied, and
  adjust an assistance value that controls an operation force of a steering wheel, based on the critical collision steering angle,
  wherein in response to a case in which tire slipping has occurred in the vehicle over a predetermined period of time, the processor determines that the assistance adjustment condition is not satisfied and performs steering torque assisting control.

15. The electric power steering apparatus of claim 14, wherein in response to determining that there is no possibility of colliding with the object in front and there is a possibility of colliding with the object to the side, the processor determines that the assistance adjustment condition is satisfied.

16. The electric power steering apparatus of claim 14, wherein in response to at least one of a case in which the vehicle is stopped, a case in which a failure has occurred in an ambient environment recognition apparatus installed in the vehicle, a case in which a failure has occurred in a sensor installed in the vehicle, or a case in which a failure that does not allow the vehicle to travel has occurred, the processor further determines that the assistance adjustment condition is not satisfied.

17. The electric power steering apparatus of claim 14, wherein in response to determining that a direction of a steering angle of the vehicle is equal to a direction of the critical collision steering angle and an absolute value of the steering angle of the vehicle is greater than or equal to an absolute value of the critical collision steering angle, the processor restricts the assistance value.

18. The electric power steering apparatus of claim 14, wherein in response to determining that a direction of a steering angle of the vehicle is equal to a direction of the critical collision steering angle and an absolute value of the steering angle of the vehicle is less than an absolute value of the critical collision steering angle, the processor adjusts the assistance value that is calculated by multiplying an assistance weight value to a basic assistance value,
  wherein the basic assistance value is a predetermined assistance value at each steering angle, and increases as the steering angle increases when the vehicle is steered to left or right, and
  wherein the assistance weight value is a predetermined weight value at each steering angle, and is multiplied to the basic assistance value so as to obtain the adjusted assistance value, wherein the assistance weight value is obtained from a predetermined lookup table or graph of an assistance weight value at each steering angle.

19. The electric power steering apparatus of claim 18, wherein the assistance weight value is inversely proportional to the absolute value of the steering angle of the vehicle.

20. A method of adjusting an assistance value based on whether there is a possibility of a vehicle colliding with an object to a side of the vehicle by means of an electric power steering apparatus, which comprises a processor, of the vehicle, the method comprising steps of:
  determining, by the processor, whether an assistance adjustment condition is satisfied based on whether there is a possibility of the vehicle colliding with the object to the side;
  determining, by the processor, a critical collision steering angle at which the vehicle collides with the object to the side in response to determining that the assistance adjustment condition is satisfied; and
  adjusting, by the processor, the assistance value that controls an operation force of a steering wheel, according to a steering angle of the vehicle based on the critical collision steering angle by means of the electric power steering apparatus of the vehicle,
  wherein the determining whether the assistance adjustment condition is satisfied comprises, in response to a case in which tire slipping has occurred in the vehicle over a predetermined period of time, determining that the assistance adjustment condition is not satisfied and performing steering torque assisting control.

\* \* \* \* \*